Nov. 11, 1930.  A. ALLEN  1,781,153
MEANS FOR MEASURING MOISTURE CONTENT OF SHEET MATERIAL
Filed Dec. 2, 1926  4 Sheets-Sheet 1
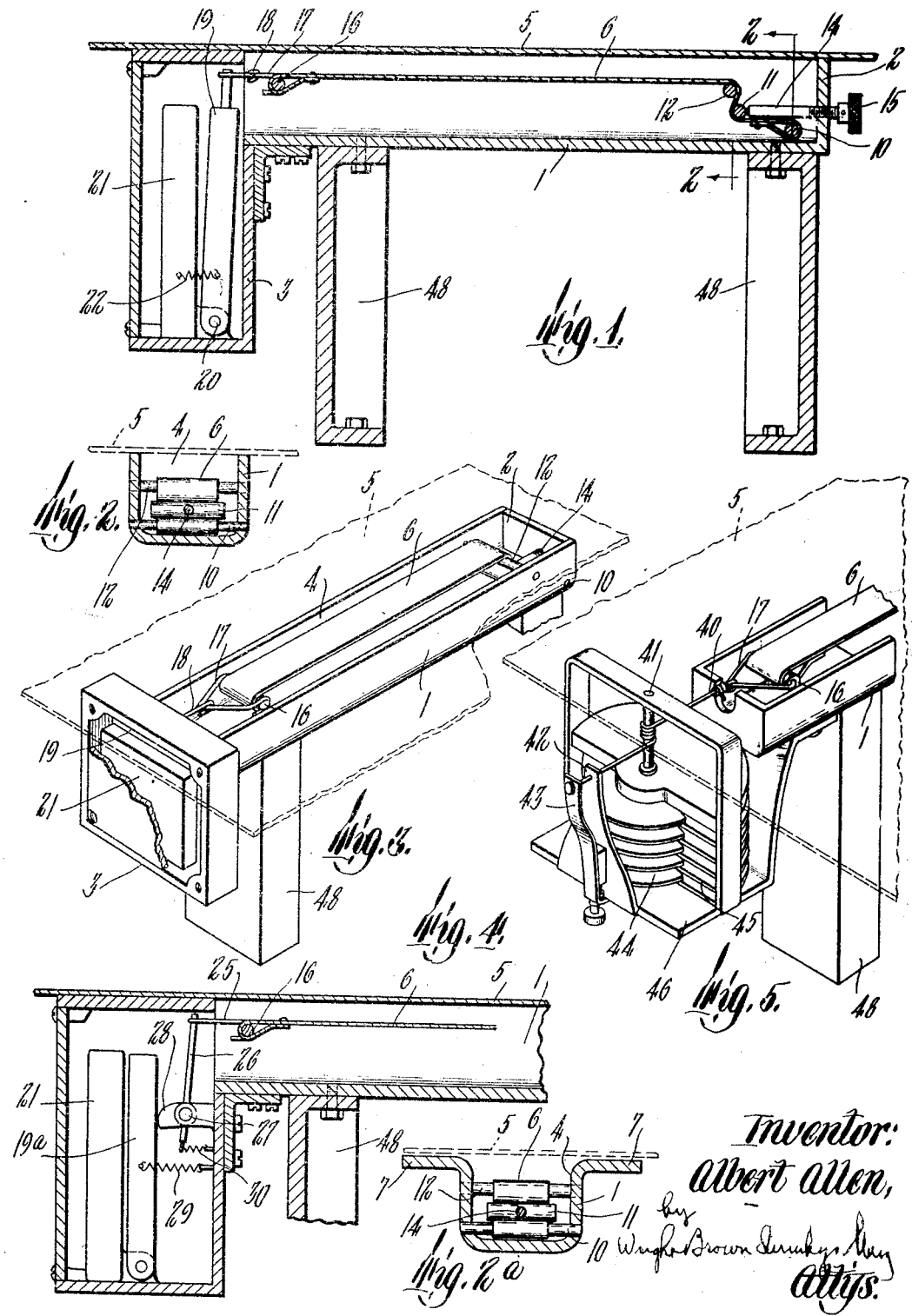
Inventor:
Albert Allen

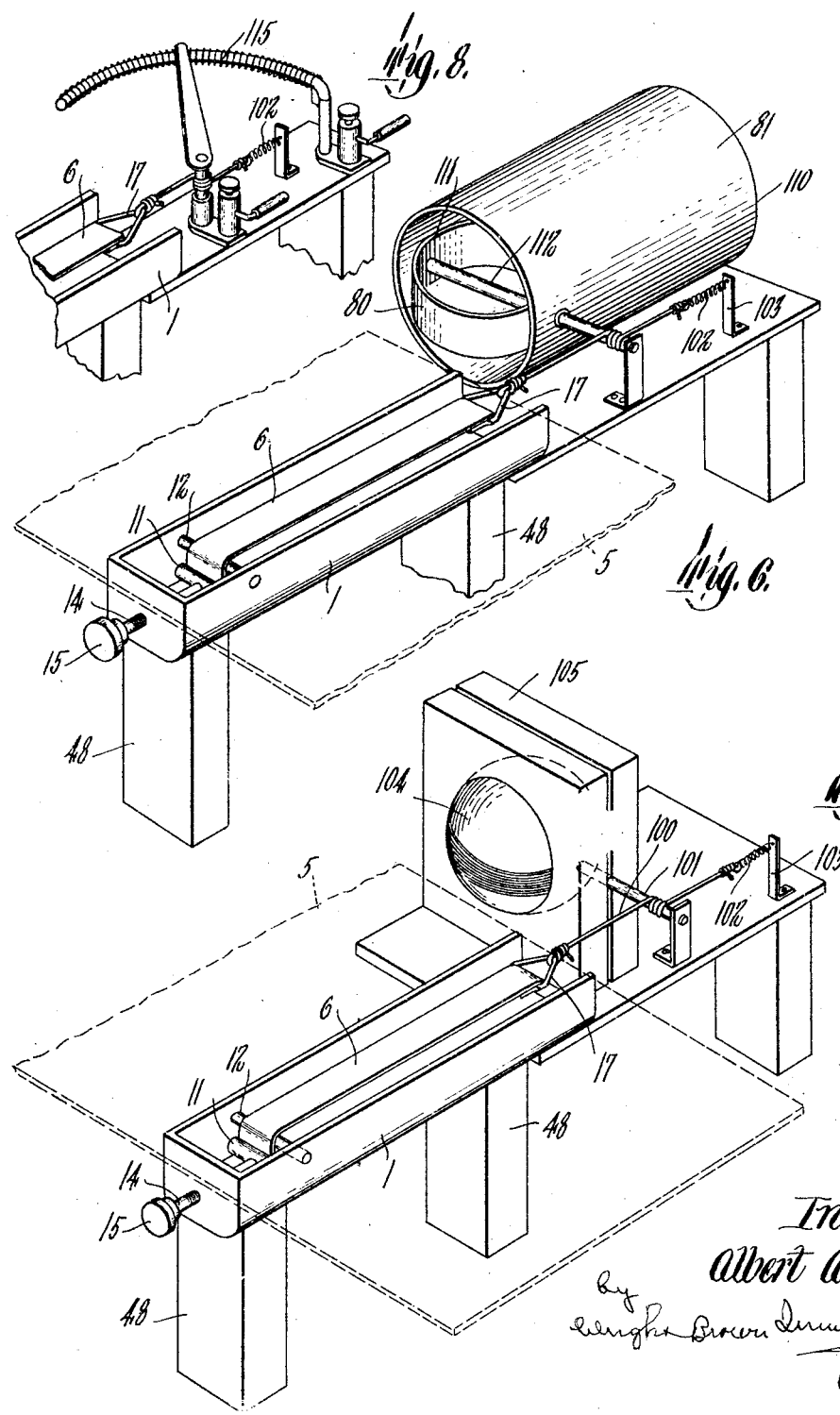

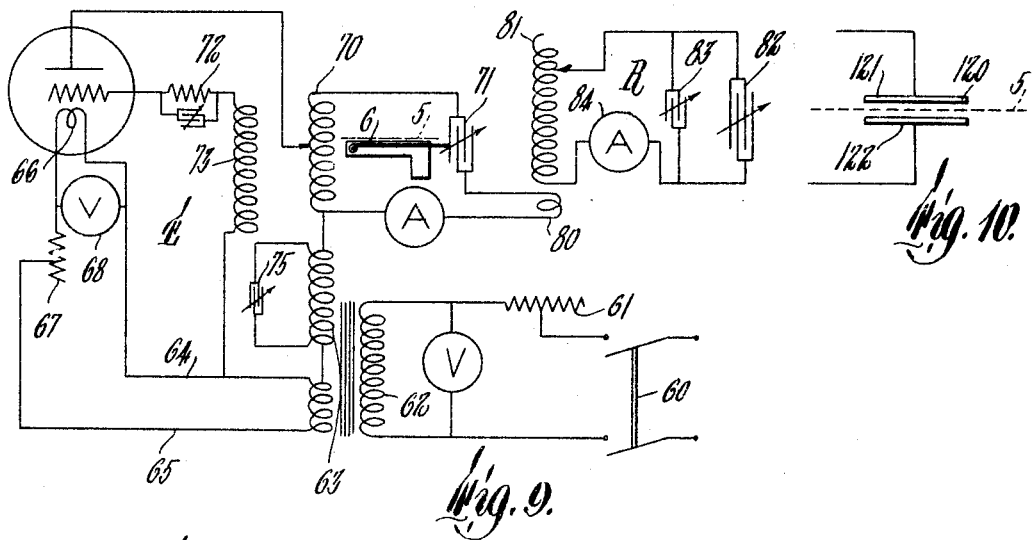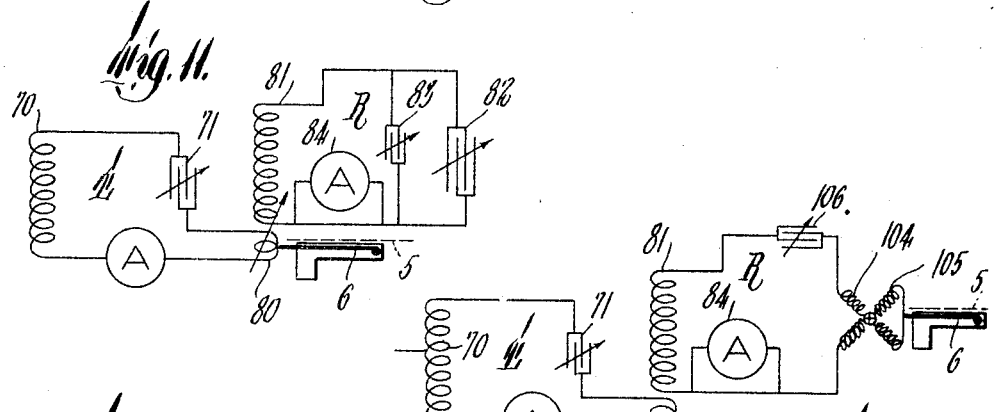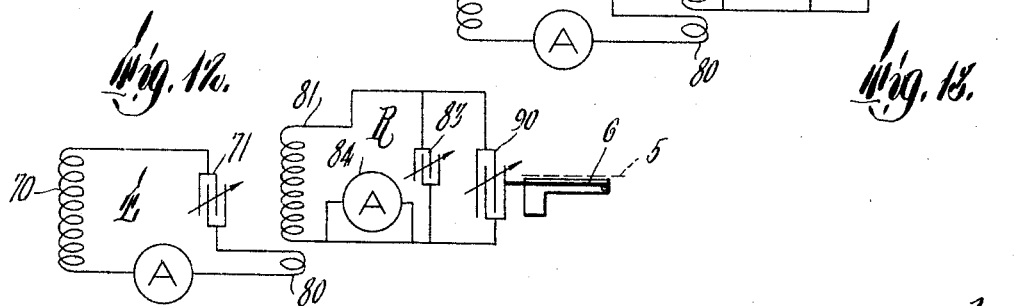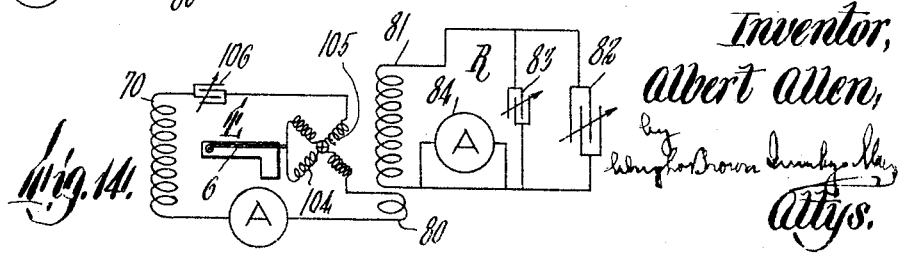

Inventor:
Albert Allen,
by Wright Brown Quimby Atty
Atty's.

Patented Nov. 11, 1930

1,781,153

UNITED STATES PATENT OFFICE

ALBERT ALLEN, OF WINCHESTER, MASSACHUSETTS, ASSIGNOR TO ATLANTIC PRECISION INSTRUMENT COMPANY, OF BOSTON, MASSACHUSETTS, A CORPORATION OF MASSACHUSETTS

MEANS FOR MEASURING MOISTURE CONTENT OF SHEET MATERIAL

Application filed December 2, 1926. Serial No. 152,126.

This invention relates to measuring the moisture content of material, and while not limited thereto is more particularly concerned with the continuous measurement, and if desired, continuous indication of the moisture content of material more especially in the form of a moving web or sheet of indeterminate lengths, or if desired, with the correction for moisture content of the material where a measurement of the dry constituents only of this material is desired.

In accordance with this invention, means are provided for measuring the deformation of the hygrometric material due to variations in moisture content thereof, this hygrometric material being placed in responsive relation to the material to be tested so that its moisture content may bear some relation to the moisture content of the material to be tested. Such deformation may be a dimensional one, the hygrometric material being preferably in the form of a filament, or ribbon, the length of which is variable with variations of its moisture content. Such changes in the hygrometric element may be readily and accurately measured, as for example, by causing them to effect changes in electrical characteristics and measuring the amount of such electrical characteristics and their changes. More specifically such deformation, or dimensional changes of the hygrometric material may be caused to affect the flow of current in a suitable circuit in any of a number of ways. One of these is by causing such dimensional changes to change the tuning of one of two high frequency oscillatory circuits near to resonance with each other so as to vary their nearness to resonance, one of these circuits having means to excite current flow in the other, the induced current in the other being measured. Such dimensional changes may also be used to vary the coupling between such circuits, their nearness to resonance either being affected additionally, or entirely unaffected by such changes.

Such deformation, or dimensional changes, may be caused to effect changes in electrical characteristics of instruments, such for example, as variable resistance, capacities, or inductances, such changes in the instruments being measured in any suitable way. Where such changes are effected in capacities or inductances, these instruments may be used as tuning devices for high frequency oscillatory circuits as hereinbefore mentioned.

For a more complete understanding of this invention, reference may be had to the accompanying drawings in which Figure 1 is a cross section through a device embodying a variable condenser having its capacity controlled by changes in length of a hygrometric filament.

Figure 2 is a detailed section on line 2—2 of Figure 1.

Figure 2ª is similar to Figure 2 but shows a modified construction.

Figure 3 is a perspective partly broken away of the same device.

Figure 4 is a view similar to a portion of Figure 1, but illustrating a modification.

Figure 5 is a view similar to a porton of Figure 3, but illustrating a further modification.

Figure 6 is a perspective of a device which may be used when the coupling between two circuits is to be varied by variation in the length of the hygrometric filament.

Figure 7 is a similar view, but illustrating a variometer in place of a condenser or coupler.

Figure 8 is a view illustrating a variable resistance controlled by the hygrometric filament.

Figure 9 is a wiring diagram of a mechanism in which variable condensers such as are illustrated in Figures 1 to 4 may be used.

Figure 10 is a fragmentary diagram illustrating one application of the hygrometer as a correction instrument in the measurement of weight of dry constituents only of wet or moist material.

Figure 11 is a fragmentary diagram illustrating the use of the mechanism shown in Figure 6.

Figure 12 is a similar diagram showing a moisture responsive variable condenser placed in the pick-up circuit.

Figures 13 and 14 are diagrams showing different arrangements of variometers, such as is illustrated in Figure 7.

Figure 15:
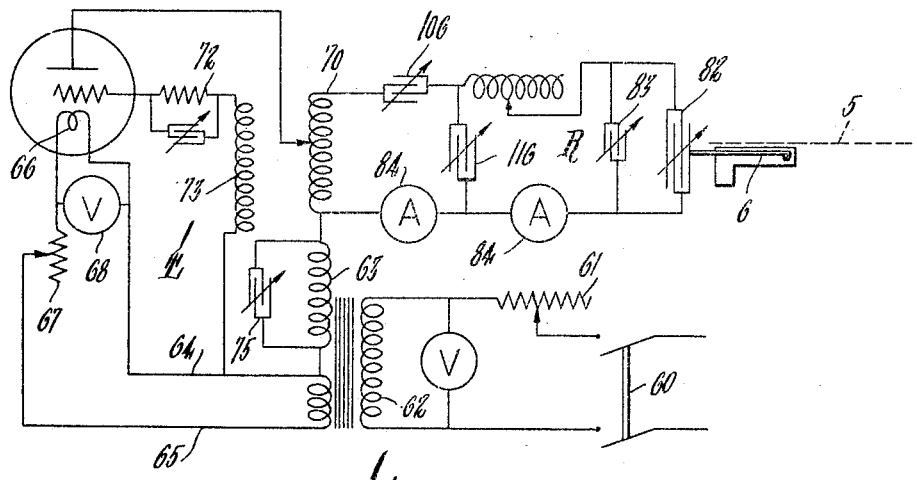
Figure 15 is a view similar to Figure 9 but illustrating capacity coupling between the exciting and receiving circuits.

This hygrometer may be used for measuring, or correcting for, the moisture content of a stationary or moving web or sheet of material, such, for example, as paper, and in the embodiments disclosed in the drawings such use has been shown, though it should be understood that this is by way of illustration only.

Referring now to Figures 1, 2 and 3, 1 indicates a trough shaped member having an end wall 2 and at the other end having attached thereto a casing 3. One side of the trough is open as shown at 4 and across this open side may be placed, or caused to travel therepast, the material the moisture content of which is to be measured or corrected for, this material, as shown in these figures, being in the form of a continuous web or sheet 5. Extending lengthwise within the trough is a hygrometric or moisture sensitive element at 6. As shown, this is in the form of a flat ribbon. A material which has been found well adapted for the purpose is a ribbon of artificial silk, or of reverted cellulose. While the ribbon may be used unchanged if desired, it is more quickly responsive to moisture changes in the material 5 when the filling threads over a substantial portion of its length have been removed, leaving only the warp strands which then form closely spaced filaments under substantially equal tension. Such a hygrometric element is disclosed and claimed per se in my Patent 1,708,073 granted April 9, 1929 for method and mechanism for determining the moisture content of paper or other material. As shown in that patent, the hygrometric material is employed as the dielectric of a condenser, the capacity of the condenser varying with the moisture content of the dielectric.

In the present application the hygrometric material is not used in this manner, but its changes of length due to changes in its moisture content are availed of. One end of the hygrometric filament or ribbon is shown as looped about or attached to a fixed pin 10 extending transversely of the trough, and adjacent to its closed end 2. From this pin 10 the element 6 extends beneath a small bar 11 and then over a guide pin 12. The guide pin 12 is fixed in the side walls of the trough 1 and the bar 11 is adjustable for a purpose which will later appear by means of a rod 14 having its inner end bearing thereon, this rod being threaded through the wall 2 and having an adjusting head 15 fixed to its outer end. The opposite end of the member 6 is looped about a small bar 16, which is connected by suitable means, such as the links 17 and 18 to the end portion of a movable leaf 19 of a variable condenser of the "book" type. This leaf 19 is shown as pivoted at 20 to a fixed leaf 21, the leaves 19 and 21 being housed within the casing 3. These leaves are normally urged toward each other by means of a spring 22 which acts also to hold the filament 6 under a small amount of tension. Adjustment of the bar 11 by means of the screw rod 14 acts to determine the amount by which the hinged leaf 19 is pulled away from the fixed leaf 21 under any particular moisture content of the hygrometric element 6.

This construction, therefore, comprises a variable condenser, variations in capacity of which are produced by the elongation or shortening of the hygrometric material in response to its giving off or absorption of moisture. As the filament lengthens as it absorbs moisture, it is evident that the capacity of the condenser increases, but if desired this hygrometric element may be so operatively connected to the condenser as to produce the reverse condition. This is illustrated in Figure 4 in which the element 6 is connected through its bar 16 and a link 25 to an arm 26 fixed to a rock shaft 27. This rock shaft has fixed thereto a cam 28 which acts on the outer face of the pivoted leaf 19A, the cam being so formed that as the element 6 shortens, the movable leaf 19A approaches the fixed leaf 21. A spring 29 acts to hold the leaf 19A away from the fixed leaf 21 as far as is permitted by the cam, and a spring 30 acting on the opposite end of the arm 26 from the attachment of the link 25 thereto acts to impart the desired tension to the element 6.

In place of a condenser of the "book" type a variable condenser of the rotating type may be used, and as such a condenser, if the movable plates are permitted to rotate through 360 degrees has its capacity increased during one half of this rotation and decreased through the other half, such a condenser may be connected up so as either to increase or decrease its capacity with lengthening of the hygrometric element due to its absorption of moisture. A condenser of this type is shown in Figure 5. Referring to this figure, it will be seen that a cord 40 is attached at one end of the link 17 bearing on the bar 16 about which the end of the element 6 is looped, and passes about the shaft 41 of the rotating variable condenser being preferably fixed to this shaft at some intermediate point of its convolutions therearound, the opposite end of this cord extending through a guide plate 42 and being fixed to a leaf spring 43 which acts to hold the cord 40 and the element 6 under proper tension. To this shaft 41 are fixed the usual movable condenser plates 44 and between these movable plates are the fixed plates 45. This rotary condenser is shown as supported in a frame 46 which is made fast to the member 1 in proper position.

In all these devices it is seen that the capacity of the variable condenser is varied by variations in the moisture content of hygrometric material which is placed in responsive relation to the moisture content of the material which is to be tested. The trough 1 which partially surrounds the hygrometric material acts to shield it from moisture conditions other than those derived from the material to be tested. As shown the instrument comprising the variable condenser and the hygrometric element partially enclosed within its trough shaped casing, is supported on suitable standards 48 so that it may be maintained in proper relation to the material to be tested, which may pass continuously over the open side of the trough closely adjacent to its edges. It is found in actual practice that it is not essential that this material engage the edges of the member 1, it being sufficient if the material is positioned closely adjacent thereto. Where no actual contact with the edges of the member 1 is desired, it is usually advantageous to flange outwardly the upper edges of this member as shown at 7 in Figure 2ª to define with the traveling material a thin broad space acting in the nature of a labyrinth packing and preventing ready interchange of moisture conditions within and without the trough. Since it does not require actual contact, no obstruction to the free passage of the web of material to be tested is produced by this mechanism.

The action of this device may perhaps be better understood by considering the relation existent between the moisture content of the material being tested and the moisture content of the hygrometric element 6. When a moisture absorbent material such as paper or a textile is exposed to air containing moisture, its moisture content, if not already at such a point, moves toward an equilibrium point or "regain" determined by the character of the material and the moisture content and temperature of the surrounding air. At the surface of the material vapor is being discharged at a pressure determined by the water vapor pressure corresponding to the temperature of that surface and at a rate partly determined by this and partly by the opposing molecular attraction of the particular material for the contained moisture at the existing degree of dampness, that is, its hygroscopic characteristic or constant at that moisture content. At that same surface moisture is being concurrently deposited at a rate determined by Dalton's law and partial pressure of water vapor in the surrounding air, the temperature, and again the hygroscopic constant of the material at its existing degree of dampness. In relation to both actions the moisture at and below the surface of the material is tending to equilibrium by capillary re-distribution. At a certain surface moisture eventually equalized throughout the sheet or mass, the evaporation and condensation or deposit will become equal. This equilibrium will be that proper to the immediately adjacent layer or pellicle of air next to the material. The degree of circulation or turbulence in the air surrounding the sheet or mass of material will determine how quickly the moisture in this adjacent pellicle will come to be the same as that of the body of air of which it is a part. When the rate of surface discharge and deposit of moisture have become equal and the moisture content of the body of air has become the same as that of the skin of air adjacent to the more or less moist sheet and the moisture throughout the sheet is equalized with that at the surface, complete moisture equilibrium will have been established at a definite moisture content and will not change until one or more of the conditions change.

If the body of air concerned be limited and contained moisture can not find permanent lodgment except in that air or else on and eventually in the moist solid material, the following condition will obtain: Suppose the sheet or other mass of material to be initially so moist that the vapor discharge from its surface is greater than the moisture deposited thereon, the sheet will then progressively become drier and the limited body of air moister and by the processes just described an equilibrium will in time supervene at a higher moisture content for the sheet than would have corresponded to that for the same sheet exposed to air at the initial condition but lower than that of the original sheet condition. The converse is equally true.

If, now there are exposed to the same limited body of air, preferably somewhat turbulent or in circulation, two specimens of like or hygroscopically similar materials at two different moisture contents, we have a condition differing from that just described in that it is possible that moisture discharged from one specimen may go elsewhere than into the limited body of air since it may go to the other specimen. The air may be initially so dry as to dry both specimens or so damp as to moisten both, or of an intermediate dampness, but through the greater relative moisture discharge from the damper specimen and the greater relative moisture absorption into the drier one, a condition will eventually be arrived at where the limited body of air is subtracting moisture from the damper specimen and adding moisture to the drier one. This will go on until the moisture content of the two specimens is equal or else has a definite permanent inequality determined only by their different hygroscopic constituents if they be different.

If now the total weight and surface of one of the specimens be very great compared with that of the other, then the moisture content of both will finally be determined very nearly by that of the larger one, but whether it will be in fact identical with that of the larger one during a defined available period of time, if at all, depends on the relative hygroscopic constants of the two materials up to about that wetness where the smaller specimen has taken up the amount of moisture corresponding to its permanent exposure to water vapor at the steam-table pressure of saturated steam at that temperature. If the larger specimen were made still wetter, the smaller would take up practically no more.

The apparatus just described, it will be noted, provides a chamber containing the hygrometric ribbon substantially closed in by solid walls and the moving more or less moist web of material, the moisture content of which is to be tested. The skin friction of this moving wall of material upon the body of air in the chamber is quite sufficient to produce a circulation such that each element of air comes successively into contact with the moving material and also into contact with the ribbon, frequently enough to constitute the equivalent of two hygroscopic materials in a limited circulating turbulent body of air. The total surface of the moving material exposed to the air in the chamber in an appreciable unit of time is very large in relation with the surface of the ribbon so that the moisture content of the body of air and of the ribbon will eventually be determined by that of the surface of the moving material except that on account of the brief exposure of each element of the moving paper to the enclosed air, there is here very little effect from anything but the surface. Up to that moisture content of the hygroscopic ribbon where it has taken on substantially all the moisture that it will take on from saturated air at that temperature, the moisture content of the ribbon will be dependent on the relative hygroscopic constants of the moving material and the ribbon and will not be a function of temperature in any appreciable degree. If the temperature is high, the evaporation from the paper will be augmented and the deposition or condensation lessened thereby and the limited body of air will contain a large absolute moisture content but will deposit on the ribbon and evaporate from the ribbon according to the same law so that within moisture ranges short of the maximum saturation of the ribbon for saturated air at a given temperature, the result will be measurably the same. It will be noted that the limited body of air is arranged in elongated form extending crosswise of the direction of travel of the sheet. It thus is made responsive to the moisture content of a considerable width of the material being tested and as it is relatively narrow the motion of the sheet material effects a rapid and thorough circulation of the body of air so that it comes into intimate contact with the surface of the sheet material and also with the surface of the ribbon.

The change in capacity of condenser by the variations of the moisture content of the hygrometric material may be made use of in various ways, for example, it may be made directly to indicate the moisture content of the material which is being tested, or it may be utilized as a correction factor to eliminate the moisture content from a measurement of the weight of the material which is being tested.

The use of a variable condenser variations in capacity of which are produced by moisture changes in a moisture sensitive element to give a direct indication of the moisture content of material being tested is shown in one form in my Patent 1,708,073 hereinbefore referred to and its utilization to obtain a correction factor in the measurement of the weight of moist or wet material to determine the weight of its dry constituents is illustrated in my Patent 1,708,074 granted April 9, 1929, for indicating and controlling method and mechanism for paper making machines and the like. As shown in these patents such a variable condenser may be used as a tuning member in an oscillatory high frequency electric circuit. To this circuit is coupled a second high frequency oscillatory electric circuit tuned nearly to resonance therewith. One of these circuits is an exciting circuit and the other a pick-up circuit. The nearness to resonance between these circuits determines the current flow in the pick-up circuit and this nearness to resonance is affected by variations in capacity of the variable condenser which is controlled by the moisture content of the material.

The variable condenser controlled by the deformation of the hygrometric element is somewhat more flexible in its application to such circuits than one wherein the hygrometric material is used as a dielectric for a variable condenser, as illustrated in said application. This is for the reason that an increase of length of the hygrometric element may be used either to decrease or increase capacity of the condenser, and, by choice of the proper size or type of condenser and of the operative connections thereto, to any desired extent, whereas an increase of moisture content of hygrometric material when used as a dielectric of a variable condenser is effective only to increase the capacity of the condenser and this to an amount not so readily adjustable to suit particular conditions.

Referring now to Figure 9, a wiring diagram illustrating one application of a variable condenser such as is illustrated in Figures 1 and 2 is shown. At E is shown an exciting oscillatory circuit which may receive its energy from any suitable source, herein shown as from a 110 volt A. C. circuit. In this 110 volt circuit is shown the controlling switch 60 and a rheostat 61, this circuit including the primary 62 of a transformer. The secondary 63 of this transformer is tapped to furnish sufficient voltage across the conductors 64 and 65 for lighting the filament 66 of a three-electrode tube, such as may be used for a low power radio transmitter. In this filament circuit is the usual rheostat 67 and the voltmeter shown at 68 across the filament terminals. The other portion of the secondary 63 supplies, say, 550 volts for the plate circuit which includes a part of the inductance 70. This inductance, and the capacity 71, varied by the moisture content of the hygrometric element are in a closed circuit within which exciting oscillations are set up.

The grid terminal is connected through a grid leak 72 and a feed back coil 73 to conductor 64. The plate secondary portion of the secondary coil 63 is shunted by a variable condenser 75. While a specific circuit more particularly described and claimed in the application for patent of R. F. Field Serial No. 227,694 filed October 21, 1927, has been illustrated in the present application it should be understood that any means of exciting oscillating high frequency circuit may be used, but for best results it should be as stable as possible. The circuit including the inductance 70 and the variable condenser 71 also includes means for coupling this exciting circuit to a pick-up circuit R. This coupling may be magnetic, capacitative, resistance or inductive as illustrated by Figures 9, 15, 16 and 17, respectively. This pick-up circuit includes an inductance 81 with which the coil 80 in the case of magnetic coupling shown in Figure 9, is coupled and the condensers 82 and 83, one of these condensers as 83 being preferably a vernier condenser so as to provide for fine tuning. Also included in this pick-up circuit is a thermo-ammeter 84 or other suitable current measuring instrument adapted to measure high frequency currents.

The condensers 82 and 83 are adjusted so that the pick-up circuit is tuned toward resonance with the exciting circuit, so that variations in the capacity of the condenser 71 in the exciting circuit due to moisture variations in the material to be measured shall cause variations, preferably on one side only of resonance, in the tuning of the pick-up circuit. When the pick-up circuit is maintained on one side of resonance with the exciting circuit, the indications of the thermo-ammeter thus become a measure of the variations in capacity of the condenser 71 due to variations in the moisture content of the material being tested. Consequently this instrument may be calibrated directly in moisture content of such materials. Of course should it be found desirable, the condensers 82 and 83 may be so adjusted as to maintain the exciting and pick-up circuits in resonance as shown by maximum reading on the thermo-ammeter or to maintain a standard detuned reading, whereupon the changes of these condensers 82 and 83 to maintain the circuits in resonance or at the desired extent of detuning, become direct measures of the changes in moisture content of the material being tested.

In place of introducing the condenser variable in capacity with variations of moisture content in the exciting circuit, it may be placed in the receiving or pick-up circuit. This is shown in Figure 12 in which the condenser variable with variations in the moisture content is placed at 90 in the receiving circuit R in place of the condenser 82 shown in Figure 9.

The use of deformation in the hygrometric material also permits it to be utilized in other relations than to control the capacity of a variable condenser and in certain of these other relations in connection with a pair of oscillatory electric circuits. For example, it may be used to control a variable inductance, this inductance being used as a variable tuning element responsive to moisture content of material being tested, in place of a variable condenser. This is illustrated in Figures 13 and 14 in which the pick-up circuits are shown completely, while the closed oscillatory portion of the exciting circuit only has been shown.

Figure 7 also illustrates a physical embodiment of the variable inductance, the variations of which are controlled by variations in length of the hygrometric element. Referring to Figure 7 it will be seen that the hygrometric element 6 is maintained within a trough shaped casing 1 as in the construction previously described, and that the link 17 has attached thereto a cord 100, which passes about the shaft 101 of a variometer, the opposite end of this cord being connected through a spring 102 with a fixed bracket 103. As shown this variometer comprises a coil 104 carried by a ball fixed to the shaft 101 whose angular relationship to a fixed coil carried in a fixed casing 105 may be varied in the well known manner. Any other form of variometer may be used however. Since a variometer increases in inductive reactance as the ball is turned through 90 degrees in one direction and decreased in inductive reactance as the ball is turned through the adjacent 90 degrees, either an increase or a decrease in reactance with increase of moisture content of material to be tested may be produced. Such a variometer may be used as a tuning element in the pick-up circuit as shown in Figure 13, or in the exciting circuit as shown in Figure 14 as may be desired, in either case a capacity 106 being in series therewith, the variometer acting as a tuning element in place of the variable condenser such as is shown in Figures 9 and 12.

Figure 16:
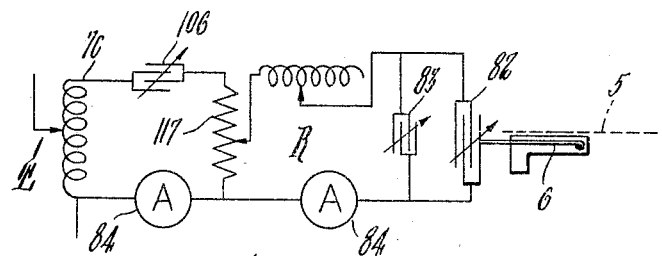
Figures 16 and 17 are fragmentary circuit diagrams illustrating resistance and inducting couplings respectively, between these circuits.
Figure 17:
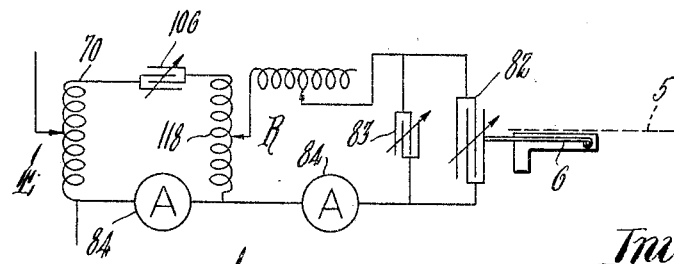

Deformation of such a hygrometric element may also be employed to vary the coupling between the exciting and receiving circuits, this being shown in Figures 6 and 11. In Figure 6 the mounting of the hygrometric element is substantially the same as that shown in Figure 7, but in place of the variometer the variable coupling device comprising an outer cylinder 110 about which is wound the coil 81 of the pick-up circuit and an inner angularly movable ring 111 carrying the coil 80 of the exciting circuit is employed. By rotation of the shaft 112 through its connection with the hygrometric element 6, it is evident that these coils 80 and 81 may be put nearer to or further from parallel relation, thus increasing or decreasing the closeness of coupling of the two circuits, and increasing or decreasing correspondingly the current induced in the pick-up circuit for the same nearness to resonance with the pick-up circuit. Likewise, the coupling may be varied where this coupling is a variable condenser as shown at 116 in Figure 15, a variable resistance 117 as shown in Figure 16, or a variable inductance 118 as shown in Figure 17.

In actual practice a variable capacity coupling as shown at 116 in Figure 15 is usually to be preferred, the action being smooth, there being no movable leads which may vary in relative position from time to time thus to introduce errors, and the capacity variation being continuous rather than by small increments. Of course, if desired, a combination of variation of the coupling and variation of tuning of either the exciting and receiving circuits might be employed. This may be present where capacity coupling is employed, coupling changes also causing capacity changes in both of the coupled circuits.

As shown in Figure 8, also, the hygrometric material whose deformation is due to changes in moisture content of material to be tested may be used to vary a variable resistance 115, this being measured in any suitable or usual manner as by measurement of current flow in a circuit containing such resistance to produce an indication of the moisture content of the material to be tested.

While as illustrated in Figures 9 and 11 to 14, a direct indication of the moisture content of the material has been desired, changes in the relative tuning between the two circuits or their relative coupling could be employed to correct for the moisture content of the material where it is desired to measure the dry weight or mass of the material, similarly to the mechanism illustrated and claimed in my Patent 1,708,074 hereinbefore mentioned. Where this is desired, in place of the condenser 82, as shown for example in Figure 9, a condenser 120 shown in Figure 10 could be substituted, this condenser 120 having invariably spaced condenser plates 121 and 122 between which the material which is to be tested is placed or passed. In the construction shown in my application last mentioned it was necessary that the moisture correction condenser, whose capacity varied with the variations in moisture content of the material, be placed in the other of the two circuits to that in which the condenser having as its dielectric the material to be tested is placed, this being due to the fact that an increase of moisture content of the dielectric can be used only to increase the capacity of the condenser of which the dielectric forms a part. Since in the present mechanism an increase of moisture content in the material may be used either to increase or decrease the capacity of the variable condenser, or to increase or decrease the value of a tuning inductance, or to increase or decrease the coupling between the two circuits, the condenser plates between which the material is passed and the correction instrument may be placed in the same or opposite circuits, depending upon whether the correction instrument is constructed so that an increase of moisture decreases or increases its tuning values.

Where the material to be tested is moving so that successive portions thereof come into and out of position wherein the moisture content of the hygrometric element is responsive to the moisture content of the material, a continuous or running indication of or correction for the moisture content of the material is obtained.

Having thus described certain practices and embodiments of this invention, it should be evident to those skilled in the art that variations and modifications may be made therein without departing from its scope or spirit as defined by the appended claims.

I claim:

1. In a machine of the class described, a hygrometric filament variable in length in accordance with its moisture content, means for holding said filament in extended position in proximity to sheet material so as to be responsive in its moisture content to the moisture content of said material, means for shielding said filament against moisture conditions other than those from said material, and a device having an electrical characteristic varied by the variations in length of said filament.

2. In a mechanism of the class described, a casing having an open side across which material the moisture content of which is to be tested may be passed, a hygrometric filament in said casing variable in length with its moisture content, said filament being fixed at one end, a device having a movable member, an electrical characteristic of said device being variable by movement of said member, and means for operatively connecting the opposite end of said filament to said member to cause variations in the length of said filament to vary said characteristic.

3. A hygrometric device comprising a hygrometric element undergoing a physical deformation with change of moisture content, means for holding said element in responsive relation to sheet material to produce a moisture content therein proportional to that of such material, and means for indicating the resultant deformation.

4. A device for measuring the moisture content of a traveling web which comprises means including said web for enclosing a body of air in intimate contact with the surface of said web, a hygrometric ribbon held in said body of air and about which said air is circulated by the movement of said web, and indicating means responsive to the length of said ribbon and changes thereof due to changes of moisture therein.

5. A device for measuring the moisture content of a traveling web which comprises an open sided elongated casing across the open side of which said web passes, said casing being extended laterally from said open side adjacent to the face of said web, means for holding a ribbon of hygrometric material lengthwise of and within said casing in position to permit circulation of air therearound due to the movement of said web, and indicating means responsive to the length of said ribbon.

6. A device for measuring the moisture content of a traveling web, which comprises means including said web for enclosing an elongated body of air extending crosswise of said web and in intimate contact with the surface of said web, a strip of hygrometric material arranged lengthwise in said body of air and about which said air is circulated by the movement of said web, and indicating means responsive to the length of said strip.

In testimony whereof I have affixed my signature.

ALBERT ALLEN.